(12) United States Patent
Nekovee et al.

(10) Patent No.: US 11,039,326 B2
(45) Date of Patent: *Jun. 15, 2021

(54) METHOD AND APPARATUS FOR ROUTING DATA IN A WIRELESS COMMUNICATION SYSTEM

(71) Applicant: Samsung Electronics Co., Ltd., Suwon-si (KR)

(72) Inventors: Maziar Nekovee, Middlesex (GB); Mehrdad Shariat, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,987

(22) Filed: Sep. 30, 2019

(65) Prior Publication Data

US 2020/0037180 A1   Jan. 30, 2020

Related U.S. Application Data

(63) Continuation of application No. 15/783,316, filed on Oct. 13, 2017, now Pat. No. 10,433,193.

(30) Foreign Application Priority Data

Nov. 4, 2016   (GB) ..................................... 1618602

(51) Int. Cl.
*H04W 28/02* (2009.01)
*H04W 28/10* (2009.01)
(Continued)

(52) U.S. Cl.
CPC ............. *H04W 24/04* (2013.01); *H04L 45/22* (2013.01); *H04L 45/28* (2013.01);
(Continued)

(58) Field of Classification Search
CPC ............. H04W 28/0247; H04W 28/10; H04W 28/0231; H04W 24/04; H04L 45/28; H04L 45/22; H04L 47/2425
See application file for complete search history.

(56) References Cited

U.S. PATENT DOCUMENTS 7,433,336 B1   10/2008   Hobza
2005/0243772 A1*   11/2005   Lee ................... H04W 36/0011
370/331

(Continued)

FOREIGN PATENT DOCUMENTS

CN   104754004 A   7/2015
WO   2015/024524 A1   2/2015

OTHER PUBLICATIONS

International Search Report dated Jan. 25, 2018 in connection with International Patent Application No. PCT/KR2017/011611.

(Continued)

*Primary Examiner* — Brian D Nguyen

(57) ABSTRACT

The present disclosure relates to a pre-5th-Generation (5G) or 5G communication system to be provided for supporting higher data rates beyond 4th-Generation (4G) communication systems such as Long Term Evolution (LTE). According to various embodiments of the present disclosure, a method for operating an access point (AP) in a cluster of a plurality of APs in a wireless communication system comprises determining a state of the cluster, determining a flow path based on the state of the cluster, and controlling to route data through the flow path from a core network (CN) to a terminal.

14 Claims, 4 Drawing Sheets

(51) Int. Cl.
  *H04L 12/703* (2013.01)
  *H04L 12/707* (2013.01)
  *H04L 12/851* (2013.01)
  *H04W 24/04* (2009.01)

(52) U.S. Cl.
  CPC ..... *H04L 47/2425* (2013.01); *H04W 28/0231* (2013.01); *H04W 28/0247* (2013.01); *H04W 28/10* (2013.01)

(56) References Cited

U.S. PATENT DOCUMENTS

| | | | |
|---|---|---|---|
| 2007/0060127 A1* | 3/2007 | Forsberg | H04W 12/04 455/436 |
| 2007/0171869 A1* | 7/2007 | Salkintzis | H04W 36/36 370/331 |
| 2008/0247388 A1 | 10/2008 | Horn | |
| 2009/0217033 A1* | 8/2009 | Costa | H04W 12/0403 713/155 |
| 2010/0011244 A1 | 1/2010 | Mohamed-Rasheed et al. | |
| 2011/0092211 A1 | 4/2011 | Osborn | |
| 2013/0201821 A1 | 8/2013 | Yamato et al. | |
| 2013/0301510 A1* | 11/2013 | Zhang | H04B 7/0413 370/312 |
| 2015/0023208 A1 | 1/2015 | Beck et al. | |
| 2015/0111575 A1* | 4/2015 | Lei | H04W 28/0289 455/436 |
| 2015/0117210 A1 | 4/2015 | Yang et al. | |
| 2015/0173011 A1 | 6/2015 | Das et al. | |
| 2015/0223143 A1 | 8/2015 | Celebi et al. | |
| 2015/0245838 A1* | 9/2015 | Barner | B66C 1/42 606/142 |
| 2015/0288427 A1 | 10/2015 | Wang et al. | |
| 2016/0119939 A1* | 4/2016 | Himayat | H04W 72/0446 370/329 |
| 2016/0173415 A1 | 6/2016 | Wang et al. | |
| 2016/0182198 A1 | 6/2016 | Won et al. | |
| 2016/0219549 A1 | 7/2016 | Wong et al. | |
| 2016/0359872 A1 | 12/2016 | Yadav et al. | |
| 2017/0019903 A1 | 1/2017 | Talukdar et al. | |
| 2018/0123751 A1 | 5/2018 | Narasimha et al. | |
| 2018/0176855 A1* | 6/2018 | Liu | H04W 72/005 |
| 2018/0368140 A1* | 12/2018 | Centonza | H04W 72/0426 |

OTHER PUBLICATIONS

Written Opinion of the International Searching Authority dated Jan. 25, 2018 in connection with International Patent Application No. PCT/KR2017/011611.

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842 V1.0.0 (Nov. 2011), 68 pages.

Menglei Zhang et al., "Transport Layer Performance in 5G mmWave Cellular", Apr. 10-14, 2016, 7 pages.

Huawei et al., "New WI proposal: Signalling reduction to enable light connection for LTE", 3GPP TSG RAN #71 Meeting Mar. 7-10, 2016, 7 pages, RP-160540.

Anton Ambrosy et al., "Initial concepts on 5G architecture and integration", mmMagic, Mar. 31, 2016, 134 pages.

Combined Search and Examination Report under Sections 17 and 18(3) dated Apr. 27, 2017 in connection with United Kingdom Patent Application No. GB1618602.5.

Michael Peter et al., "6-100 Ghz Channel Modelling for 5G: Measurement and Modelling Plans in mmMAGIC", Feb. 12, 2016, 10 pages.

* cited by examiner

METHOD AND APPARATUS FOR ROUTING DATA IN A WIRELESS COMMUNICATION SYSTEM

CROSS-REFERENCE TO RELATED APPLICATIONS

This application is a continuation of U.S. patent application Ser. No. 15/783,316 filed on Oct. 13, 2017, now U.S. Pat. No. 10,433,193, which is related to and claims priority to United Kingdom Patent Application No. 1618602.5 filed on Nov. 4, 2016, the disclosures of which are herein incorporated by reference in their entirety.

BACKGROUND

1. Field

The present disclosure relates to a wireless communication system, and more specifically, relates to method and apparatus for routing data in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Mm-wave technology is expected to form a part of fifth generation (5G) radio access networks. It can improve capacity compared to lower frequency deployments in macro, micro, metro or localised hotspots but can also provide a consistent user experience in a standalone configuration i.e. even without support from lower frequency carriers.

However, there are certain problems experienced when using mm-wave radio signals. In particular, mm-wave radio propagation behaviour is similar to optical signals, having low diffractions and increasingly relies upon line-of sight (LoS) or strong reflections from surrounding environment due to narrow beamforming, rather than diffuse components.

As a result, mm-wave signals are more outage-prone compared to low-frequency carriers, and signal blockage can be induced by trees, street furniture, transport traffic and even human bodies. Signal blockage (in either the control or data channel) may lead to an abrupt reduction in link quality or to radio link failures (RLFs) with drastic impacts on transport layer control protocols (e.g. TCP). This, in turn, can lead to a degraded quality of experience (QoE) for end-user equipment's (UEs).

SUMMARY

To address the above-discussed deficiencies, it is a primary object to provide a method for operating an access point (AP) in a cluster of a plurality of APs in a wireless communication system that comprises determining a state of the cluster, determining a flow path based on the state of the cluster, and controlling to route data through the flow path from a core network (CN) to a terminal.

According to a various embodiments of the present disclosure, an apparatus of an access point (AP) in a cluster of a plurality of APs in a wireless communication system comprises at least one processor configured to determine a state of the cluster, determine a flow path based on the state of the cluster, and control to route data through the flow path from a core network (CN) to a terminal.

According to a various embodiments of the present disclosure, there is provided a method of steering data traffic between a Core Network, CN, and a User Equipment, UE, in a cluster of a telecommunication network, wherein the cluster comprises a plurality of Access Points, AP, and at least two of the plurality of Access Points are connected via separate Points of Access, PoA, to the Core Network, wherein the method comprises the steps of: in the event of an outage between a first Access Point and the User Equipment, either: steering data traffic from the first Access Point to a second Access Point and on to the User Equipment; or steering data traffic from a Cluster Head, CH, to a second Access Point and on to the User Equipment.

It should be noted that throughout this specification that 'Access Point' (AP) refers to a wireless station that transmits and receives data to/from the UEs. The similar term 'Point of Access' (PoA) refers to a gateway for APs towards/from the Core Network, CN.

According to various embodiments of the present disclosure, the step of either: steering data traffic from the first Access Point to a second Access Point and on to the User Equipment; or steering data traffic from a Cluster Head, CH, to a second Access Point and on to the User Equipment is determined on the basis of state of the cluster in terms of one or more of: inter-AP interface quality; level of load transported on the inter-AP interfaces; the state of interfaces towards the Core Network; and the service-level requirements of various elements in the network.

According to various embodiments of the present disclosure, the Cluster Head is assigned by the Core Network.

According to various embodiments of the present disclosure, the Cluster Head is an Access Point associated with a Point of Access, PoA, to the Core Network.

According to various embodiments of the present disclosure, the communication between at least one of the Access Points and the User Equipment utilises mm-wave technology.

According to various embodiments of the present disclosure, the Cluster Head comprises a logical controller arranged to assess the state of the cluster and to prepare rules which are propagated around the cluster so that in the result of an outage, traffic data may be steered according to the rules.

In a second aspect of the present disclosure, there is provided an Access Point arranged to be used in a network and to perform the method of the first aspect.

According to the present disclosure there is provided an apparatus and method as set forth in the appended claims. Other features of the present disclosure will be apparent from the dependent claims, and the description which follows.

Embodiments of the present disclosure to implement cell-switching between neighboring APs per cluster may use a hybrid architecture where the RAN-level split across network entities can be dynamically adjusted according to the cluster state per individual user (in terms of inter-AP interface quality, level of load transported on the interfaces, the quality interfaces towards the core network and also the expected quality of service on user-level). This enables the system to utilize the best features of each architectural variant as required, while avoiding drawbacks associated therewith, when possible.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
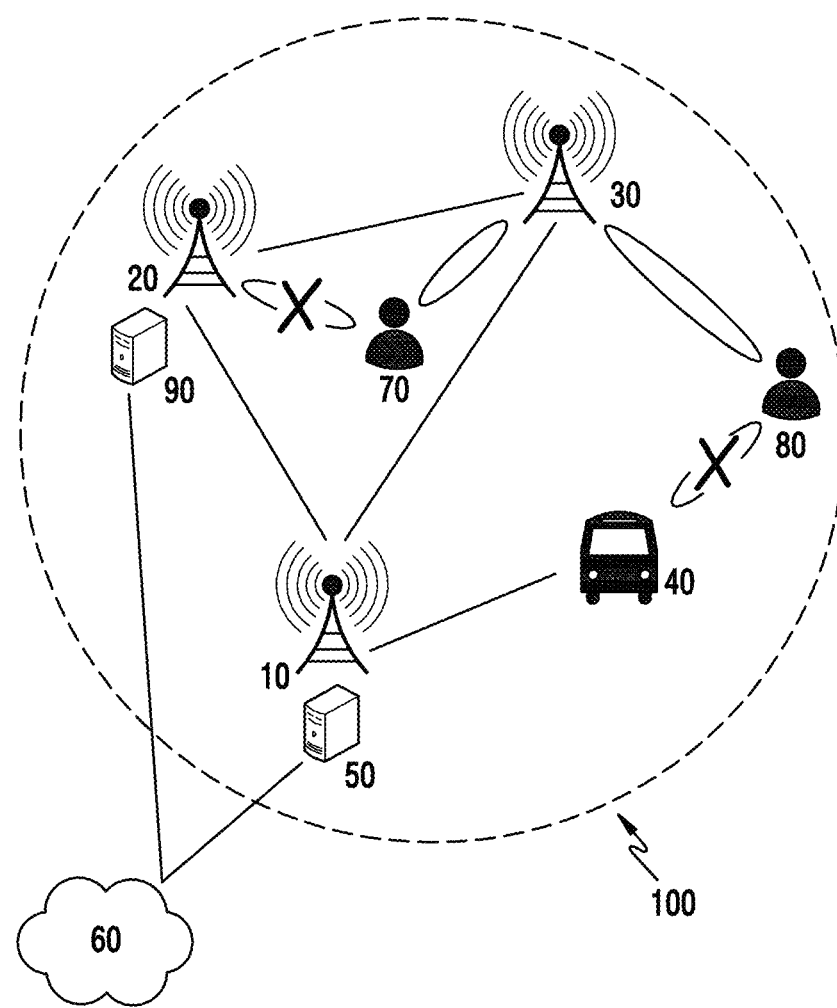
FIG. 1 illustrates a network topology according to an embodiment of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the context of mm-wave Radio Access Networks (RAN), signal outages or RLFs are not only triggered at cell boundaries in the case of high mobility but also in any location within the coverage area of a mm-wave access point (AP) as long as the strong LoS or reflection channel component is blocked by the dynamics of the environment (even if the UE is stationary).

From a physical layer perspective, developing advanced channel estimation and beamforming algorithms can assist in exploiting non-LOS paths that make use of reflections from the surrounding environment. As mentioned above, low diffraction of the signals implies a significant reduction in quality of the links even if a full RLF is avoided.

From a radio resource control perspective, clustering mm-wave APs, combined with dual connectivity (DC) has been identified as a possible solution to mm-wave outages, enabling fast cell switching from one AP to another in a case of abrupt blockage on the serving AP. DC or, generically, multi-connectivity, has been available since LTE release 12 where a UE can benefit from resources on two (or more) radio links, such as LTE. Leveraging DC, a Master cell (as one leg of a DC configuration) can control the data split to Secondary cells and also handle mobility management, masking the movement across Secondary cells from the Core Network (CN). This is also in line with the planned reduction in signaling between the RAN and CN as one of the targets for future releases.

In the planned dense deployment of small cells, the inter-AP interfaces to neighboring APs or the interfaces to the core may be at least partly realized wirelessly, over the air, via dynamic point to multipoint backhauling or self-backhauling solutions. As a result, the quality of such interfaces may change over time, due to changes in the surrounding environment, or the AP itself may move, in the case of nomadic access points, resulting in a dynamic topology of the network.

In embodiments of the present disclosure, mm-wave APs within a network are partitioned into clusters with few overlapping APs between neighboring clusters. The clustering of APs is known in the art and so is not described in great detail herein. Clustering can be done based on geographic proximity, availability of interfaces between the AP nodes in a cluster (e.g. X2-like interfaces in LTE) and also the presence of at least one reliable point of access (PoA)

from/to the CN (e.g. via S1-like interface to EPC in LTE) to guarantee inflow or outflow of user traffic to/from a cluster.

The clustering can be performed centrally by the network operators as part of cell planning. It may also evolve gradually in either a centralized or self-organized manner, based on network topology dynamics and/or the distribution of traffic load in the network. It is also assumed that one of the mm-wave APs per cluster is assigned as the cluster head (CH) to control per-cluster network operations, based on reliable access to other cluster nodes as well as being a PoA.

Upon formation of a cluster and assignment of a CH, a logical controller is configured for each cluster. The logical controller can work: as a software defined radio function within a CH; as an instance in the Cloud assuming a flexible Centralized-RAN is in place; as a function in Mobile Edge Cloud processing; or as part of a separate hardware entity with a reliable interface (high data rate and low latency) to the CH.

The logical controller runs periodic assessments of a cluster state to determine parameters such as: inter-AP interface quality; level of load transported on the interfaces; the quality of interfaces towards the core network; and expected quality of service at user-level. The frequency of this assessment is based on the inter-AP interface stability, the rate of changes in the aggregate transport traffic and also network topology. For instance, in the case of nomadic APs, the controller may trigger cluster state updates more frequently due to faster changes in network topology and/or interfaces.

In the event of an outage or degradation in quality below a defined threshold, the logical controller is able to re-route data to ensure that the user enjoys the same or similar experience.

The logical controller will pre-emptively set the mode of traffic routing or steering for different serving and potential AP pairs per individual UE in case of an outage. Here, potential AP refers to an AP with the next strongest beam signal after the currently serving AP. In some circumstances, another potential AP may be defined which does not have the next strongest beam signal, but which may be preferred as it has more available capacity, for instance.

FIG. 1 shows a schematic of a network topology, which illustrates how embodiments of the present disclosure operate. In FIG. 1, there is shown a cluster 100 of APs. In this specific example, there are three static APs 10, 20, 30 as well as a mobile AP 40, provided on a bus. These APs are serving two UEs 70, 80.

AP 10 is designated the Cluster Head and is connected to a PoA 50 which is connected to the CN 60.

Certain of the APs have good inter-AP interfaces, shown by the solid lines between them. For instance, AP 10 has good connections to APs 20, 30 and 40. Mobile AP 40 has a good connection to AP 10, but not to AP 30. In additions, AP 20 is associated with a further PoA 90, also connected to the CN 60.

UE 70 experiences an outage when communicating with AP 20, as shown by the crossed out transmission lobe between AP 20 and UE 70. In this case, data traffic can be routed to AP 30, with which UE 70 can also communicate, as shown by the transmission lobe between AP 30 and UE 70. Since AP 20 has access to PoA 90, data to and from the CN can be routed via the originally serving AP 20 to AP 30 via the inter-AP interface shown. That is, data to and from the CN can be routed via a flow path including the AP 20 and AP 30. Importantly, network traffic is not routed via the AP 10, although the AP 10 is involved in coordinating routing and setting up the route from AP 20 to AP 30, it does not, itself, handle any data traffic destined for UE 70.

The re-routing or re-steering of data traffic is controlled by the Cluster Head, AP 10.

A further scenario is shown in FIG. 1. UE 80 is in communication with mobile AP 40, but experiences an outage, as shown by the crossed out transmission lobe between AP 40 and UE 80. AP 40 has an inter-AP connection to the cluster head, but due to its mobile nature, does not have an inter-AP link to any other APs in the cluster.

As such, once the outage between AP 40 and UE 80 occurs, data traffic for UE 80 can be routed via AP 30, with which UE 80 can be served, as shown by the transmission lobe between them.

In this case, the AP 10 routes data traffic via itself and PoA 50 to/from the CN 60. That is, data to and from the CN 60 can be routed via a flow path including the AP 10 and AP 30. This differs from the previous example, in that the AP 10 is actively involved in routing data traffic to/from the CN, rather than merely coordinating the activity, as per the previous example.

Multiple modes of traffic routing or steering can be adopted, such as:
1) In the case of high quality and uncongested inter-AP interface between the serving AP 20 and potential AP 30, and a reliable-interface to a PoA 90 on the serving AP, the traffic may be directly steered (forwarded) from the serving AP 20 to the potential AP 30 when an outage/mobility management procedure is triggered. This mode of operation suits best short outages with a possibility of resuming the operation from the previous serving AP.
2) In absence of reliable inter-AP interface and/or reliable-interface to a PoA on the serving AP 40 or traffic congestion on the interfaces, the traffic can be steered via AP 10 or a PoA 50 to a potential AP 30, based on the outage status.
3) Besides the above factors, service-level requirements can be also counted as extra indicators in setting the mode of traffic steering. For instance, certain types of data traffic may be treated with a higher priority.

While the above modes have been explicitly defined, multi-mode traffic steering can be extended into other alternative variants as described later.

The Logical controller, which is a function included in the AP 10, can form user-centric look-up tables per each assessment period based on the traffic steering decisions as above. The look-up tables can be conveyed back to cluster APs 20, 30, 40 via AP 10 on mm-wave carrier, any available wired transport medium or via broadcast messages on lower frequency carriers (in the case of support via CH or a Master cell). These look up tables essentially provide information regarding possible backup options in the event of a particular AP-UE link suffering an outage. Depending on the assessment period which is defined, these can be re-assessed and re-distributed as required.

Each serving/potential AP pair will follow the latest look-up table decision upon an outage to perform mobility/outage management procedure. This means that when an outage occurs, each AP will already be in possession of the information to re-route or forward data to ensure that the UE in question continues to receive service.

Figure 2:
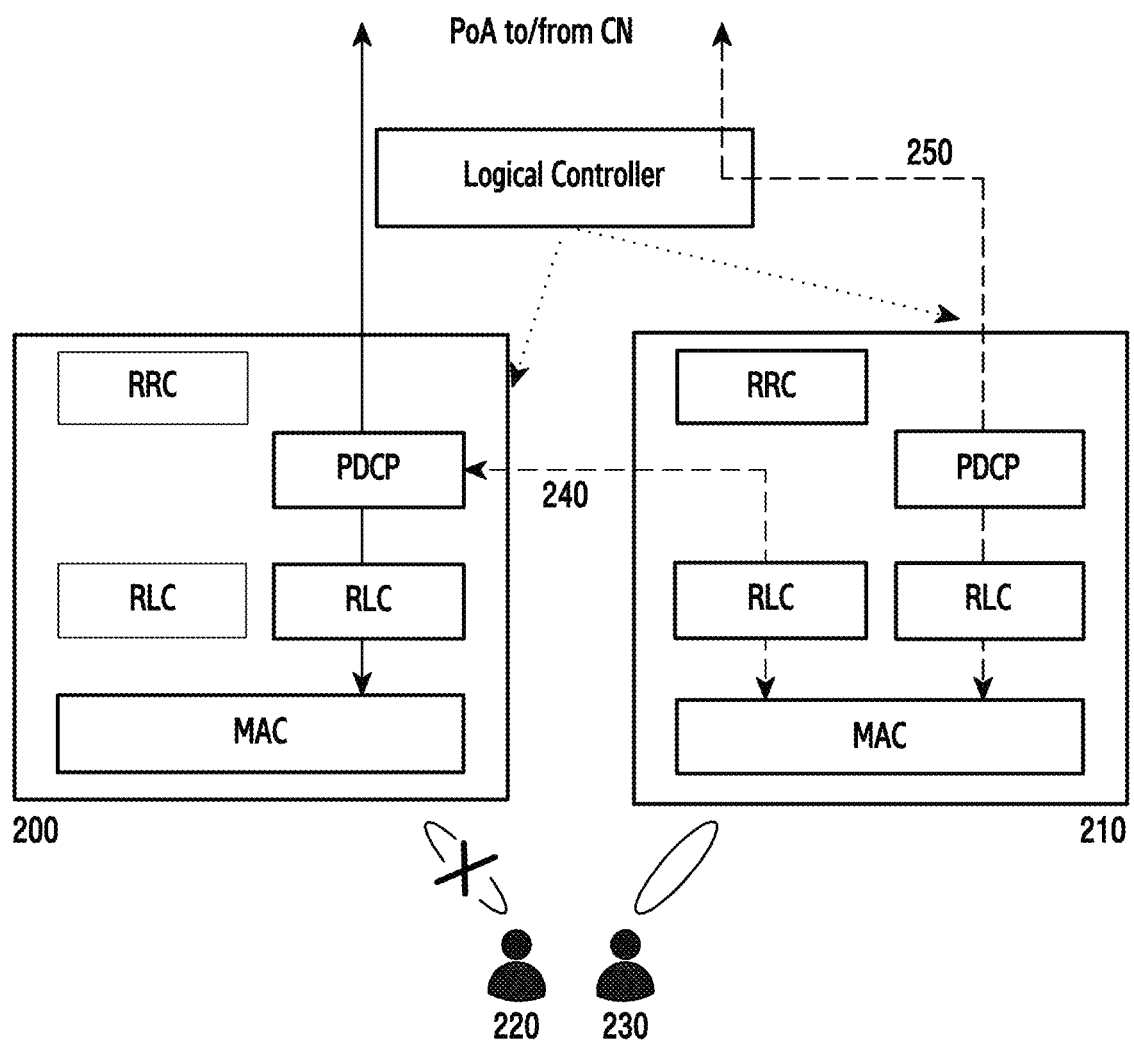
FIG. 2 illustrates an architecture according to an embodiment of the present disclosure.

FIG. 2 shows the architectural view on how a RAN-level split will be dynamically adjusted according to an embodiment of the present disclosure.

Here, nodes 200, 210 represent APs 20, 30 respectively if direct steering via interface 240 to UE 220 (in analogy to UE 70) is adopted. Nodes 200, 210 represent APs 40, 30 respectively if CH/PoA steering is followed via interface 250 to UE 230 (in analogy to UE 80).

So, by traffic steering via either interface 240 or 250, the architecture variant switches from Packet Data Convergence Protocol (PDCP)-level split to above PDCP-level split at the logical controller.

Figure 3:
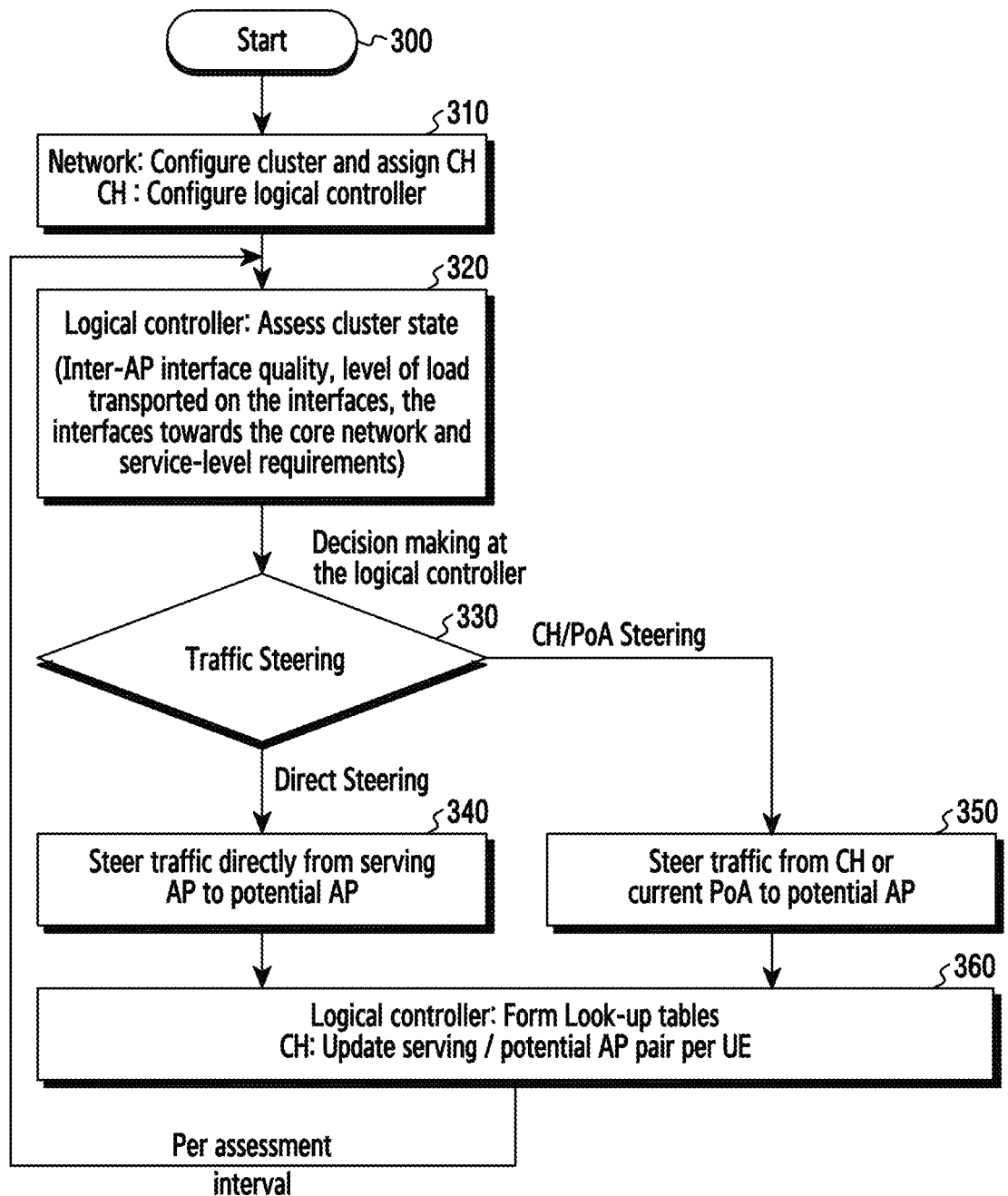
FIG. 3 illustrates a flowchart detailing a method according to an embodiment of the present disclosure.

FIG. 3 shows by way of a flowchart, the steps involved in a method according to an embodiment of the present disclosure.

Stating at 300, flow passes to 310, wherein the network at large configures the AP constituents of a cluster. In the example shown in FIG. 1, cluster 100 comprises APs 10, 20, 30 and 40. Other cluster configurations are possible and depend on the particular network constraints and features at any given time. Simultaneously, the Cluster Head, CH, is assigned and it configures a logical controller, which is a function arranged to manage the process according to an embodiment of the present disclosure.

At step 320, the logical controller function with the AP 10 assesses the state of the cluster in terms of inter-AP interface quality, level of load transported on the interfaces, the interfaces towards the CN 60 and the service-level requirements of various elements in the network.

At step 330, a decision is made at the logical controller if traffic steering is used. Not shown in FIG. 3 is the scenario where traffic steering is not used and the APs function as before.

If steering is used, a decision is made whether to steer traffic via the AP 10 or directly, via another AP in the cluster which has a suitable PoA to the CN.

In the former case, flow passes to 350 and traffic is steered from the AP 10 to the potential AP. This corresponds to the case described previously, where the serving AP is mobile AP 40, serving UE 80, which suffers an outage and traffic is steered from CN 60 via PoA 50, CH/AP 10 to AP 30 which then serves UE 80. The AP 10 is actively involved in forwarding or steering traffic to the UE 80.

In the latter case, flow passes to 340 and traffic is steered directly from the serving AP to the potential AP without passing via the CH. This corresponds to the case described previously where the serving AP 20, which has a connection to the CN 60 via PoA 90, suffers an outage while serving UE 70. In this case, AP 20 is able to forward traffic from CN 60 directly to potential AP 30, which is able to continue serving UE 70. Note that this does not involve the direct involvement of AP 10.

At step 360, the logical controller function in AP 10 forms look up tables, including rules, based on the traffic forwarding which has happened in the preceding steps. The AP 10 updates the serving and potential AP pair per each UE (or set of UEs in close geographical proximity) being served in the cluster.

After step 360, the cluster state is assessed again as flow passes back to step 320.

In an alternative embodiment, in a case of an ideal interface between serving and potential APs, particularly when the outage is partial, joint transmission schemes can be used in line with Coordinated Multipoint (CoMP) categories (in LTE-A and beyond) from both elements of a pair towards UE. In this case, the type of CoMP scheme and the RAN split (which will be below MAC-level), depends on interface delay and supported bandwidth (i.e. the lower latency and higher the bandwidth, it will be more feasible for a sub-PHY split at a bit or symbol level between the transmission points).

Embodiments of the present disclosure provide a hybrid dynamically adjustable architecture to switch bearer at RAN level to manage outages where the split can happen flexibly below or above Packet Data Convergence Protocol (PDCP) layer based on the network mode of operation. The Radio Link Control (RLC) and individual Medium Access Control (MAC) and relevant scheduler per AP may stay intact based on the scheme as shown in FIG. 2. Alternatively, tighter coordination can be incorporated at lower layers as outlined in the paragraph above.

In the direct steering case (step 340), the serving AP (node 200 via interface 240) needs to process and buffer traffic at PDCP level, therefore any changes on potential AP (node 210) can be quickly addressed including resuming the transmission from serving AP, once the outage has passed. In this case, the anchor RRC may stay at serving AP (node 200).

In the CH/PoA steering case (step 350), there is no need to steer the traffic to serving AP (node 200) and this results in low requirements on the interface between the serving and potential AP, which is suitable in cases where such a link has lower channel quality (e.g. due to AP mobility) or is congested with other transport traffic flows. The traffic steering is handled by AP 10 (via interface 250) enabling relatively fast readjustments. In this case, the anchor RRC may switch to potential AP (node 210).

In a tight coordination case, both APs may fully share the data, putting a higher burden on the interface between them. This implies a below MAC split, enabling real-time adjustments to blockages.

Figure 4:
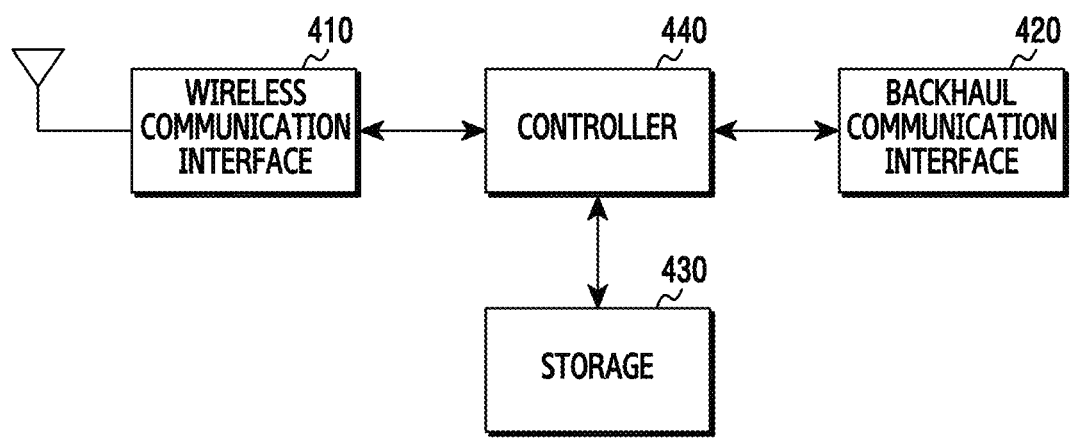
FIG. 4 illustrates an example configuration of an access point (AP) in a wireless communication system according to an exemplary embodiment of the present disclosure.

FIG. 4 illustrates an example configuration of an AP in a wireless communication system according to an exemplary embodiment of the present disclosure. FIG. 4 illustrates an example of a configuration of one of AP 10, 20, 30 and 40 in FIG. 1, and AP/node 200 and 210 in FIG. 2. Hereinafter, the term "unit" or the term ending with the suffix "-er" or "-or" refer to a unit for processing at least one function or operation and these terms may be implemented by using hardware or software or a combination of hardware and software.

Referring to FIG. 4, the AP includes a wireless communication interface 410, a backhaul communication interface 420, a storage 430, and a controller 440.

The wireless communication interface 410 performs functions for transmitting and receiving signals via a radio channel. For example, the wireless communication interface 410 performs a function of converting between a baseband signal and a bit string according to a physical layer standard of a system. For example, when transmitting data, the wireless communication interface 410 generates complex symbols by encoding and modulating a transmission bit string. In addition, when receiving data, the wireless communication interface 410 restores a reception bit string by demodulating and decoding a baseband signal. In addition, the wireless communication interface 410 up-converts a baseband signal into a radio frequency (RF) band signal and then transmit the RF band signal through an antenna, and down-converts an RF band signal received through the antenna into a baseband signal.

For example, the wireless communication interface 410 may include a transmission filter, a reception filter, an amplifier, a mixer, an oscillator, a digital to analog converter (DAC), an analog-to-digital converter (ADC), or the like. In addition, the wireless communication interface 410 may include at least one antenna array configured by a plurality of antenna elements. In view of hardware, the wireless communication interface 410 may be configured by a digital unit and an analog unit, and the analog unit may be configured by a plurality of sub-units according to operation power and operation frequency.

The wireless communication interface 410 transmits and receives signals as described above. Accordingly, the wireless communication interface 410 may be referred to as a transmission interface, a reception interface, a transmission and reception interface, a transmitter, a receiver or a transceiver. In addition, in the following description, transmitting and receiving performed through a radio channel may include processing by the wireless communication interface 410 as described above.

The backhaul communication interface 420 provides an interface for communication with other nodes in a network. That is, the backhaul communication interface 420 converts a bit string to be transmitted from the AP to another node, for example, another access node, another AP, a core network, or the like into a physical signal, and converts a physical signal received from another node into a bit string.

The storage 430 stores data such as a basic program, an application program, setting information, or the like for the operation of the AP 110. The storage 430 may be configured by a volatile memory, a nonvolatile memory, or a combination of a volatile memory and a nonvolatile memory. The storage 430 provides the stored data according to a request of the storage 430 and the controller 440.

The controller 440 controls overall operations of the AP 110. For example, the controller 440 transmits and receives signals through the wireless communication interface 410 or the backhaul communication interface 420. In addition, the controller 440 records and reads data on and from the storage 430. The controller 440 may perform functions of a protocol stack which a communication standard uses. To achieve this, the controller 440 may include at least one processor.

According to exemplary embodiments of the present disclosure, the controller 440 may determine a state of the cluster, determine a flow path based on the state of the cluster, and control to route data through the flow path from a core network (CN) to a terminal.

If the state of the cluster is below a threshold, the flow path includes a first AP and a second AP and excludes the AP. Herein, the second AP is to serve the terminal in response to a link failure of a link between the terminal and the first AP. In this case, the first AP is associated with a gateway to the CN.

If the state of the cluster is below the threshold, the flow path includes the AP and a second AP excludes a first AP.

According to various embodiments of the present disclosure, the state of the cluster comprises at least one of an inter-AP interface quality, a level of load transported on the inter-AP interfaces, a state of interfaces towards the CN, and a service-level requirements a network.

According to various embodiments of the present disclosure, the AP is a cluster head, and the cluster head is assigned by the CN. The cluster head is associated with a gateway to the CN.

According to various embodiments of the present disclosure, a communication associated with the terminal is performed in a millimeter-wave (mmWave) band.

According to various embodiments of the present disclosure, the at least one processor is further configured to generate a rule corresponding to the determined flow path.

According to various embodiments of the present disclosure, the terminal may receive data from at least two coordinating APs in the cluster.

In above cases, the inter-AP coordination is user-centric, (i.e. can be set to different modes for different sets of UEs) and tailored for a specific cluster state. Furthermore, the changes and resulting overhead are masked from the CN unless a C-RAN architecture has been adopted that relaxes the overhead issues.

Embodiments of the present disclosure are advantageously able to maintain a link to a given User Equipment in the event that a present link fails. This is particularly likely to happen in networks utilising mm-wave technology and so a robust scheme to preserve connectivity, as set out above, offers an enhanced user experience.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a first access point (AP) in a wireless communication system, the method comprising:
   detecting an outage between a second AP and a user equipment (UE), wherein the UE is connected to both the first AP and the second AP, and the first AP and the second AP are connected to a core network, (CN); and
   controlling to steer traffic for the UE through a first path including the first AP and the second AP, in response the detecting of the outage, in case that the second AP is available; and
   controlling to steer traffic for the UE through a second path not including the second AP, in response the detecting of the outage, in case that the second AP is unavailable,
   wherein the first AP comprises a packet data convergence protocol (PDCP) layer and the second AP comprises a PDCP layer.

2. The method of claim 1, wherein the traffic is transmitted from the first AP to the second AP through an inter-AP interface, and is transmitted from the second AP to the UE through a wireless channel between the second AP and the UE, in case that the inter-AP interface between the first AP and the second AP is available.

3. The method of claim 1, wherein the traffic is splitted at the PDCP layer of the first AP, in case that an inter-AP interface between the first AP and the second AP is available.

4. The method of claim 1, further comprising:
   receiving, from a head AP, information regarding a serving and potential AP pair for the UE.

5. The method of claim 1, further comprising:
receiving, from a head AP, a information regarding possible backup options to address an outage a particular AP-UE link.

6. The method of claim 1, wherein the traffic is splitted at the first AP to perform a joint transmission by the first AP and the second AP, in case that an inter-AP interface between the first AP and the second AP is available.

7. The method of claim 6, wherein the traffic is splitted at a media access control (MAC) layer or a sub-physical (PHY) layer of the first AP.

8. A first access point (AP) in a wireless communication system, the first AP comprising:
a transceiver; and
at least one processor coupled to the transceiver and configured to:
detect an outage between a second AP and a user equipment (UE), wherein the UE is connected to both the first AP and the second AP, and the first AP and the second AP are connected to a core network, (CN);
control to steer traffic for the UE through a first path including the first AP and the second AP, in response to the detecting of the outage, in case that the second AP is available; and
control to steer traffic for the UE through a second path not including the second AP, in response the detecting of the outage, in case that the second AP is unavailable,
wherein the first AP comprises a packet data convergence protocol (PDCP) layer and the second AP comprises a PDCP layer.

9. The first AP of claim 8, wherein the traffic is transmitted from the first AP to the second AP through an inter-AP interface, and is transmitted from the second AP to the UE through a wireless channel between the second AP and the UE, in case that the inter-AP interface between the first AP and the second AP is available.

10. The first AP of claim 8, wherein the traffic is splitted at the PDCP layer of the first AP, in case that an inter-AP interface between the first AP and the second AP is available.

11. The first AP of claim 8, wherein the at least one processor is further configured to:
receive, from a head AP, information regarding a serving and potential AP pair for the UE.

12. The first AP of claim 8, wherein the at least one processor is further configured to:
receive, from a head AP, information regarding possible backup options to address an outage a particular AP-UE link.

13. The first AP of claim 8, wherein the traffic is splitted at the first AP to perform a joint transmission by the first AP and the second AP, in case that an inter-AP interface between the first AP and the second AP is available.

14. The first AP of claim 13, wherein the traffic is splitted at a media access control (MAC) layer or a sub-physical (PHY) layer of the first AP.

\* \* \* \* \*